Figure 1:
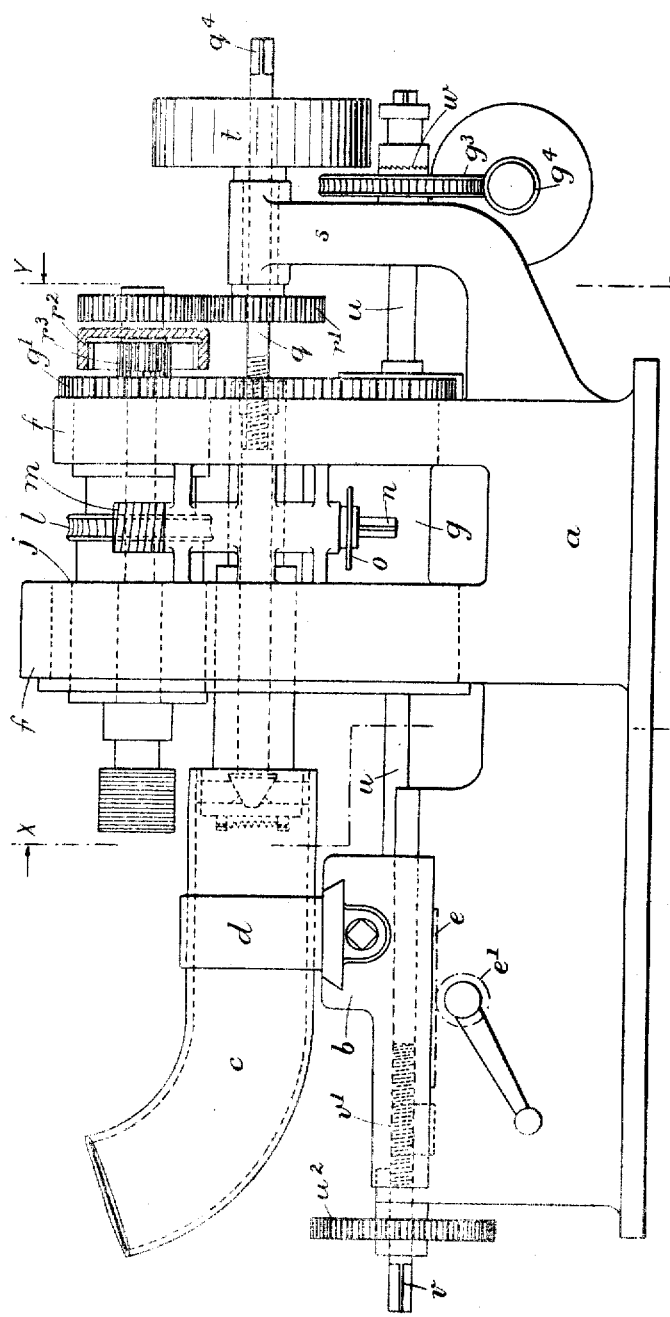

G. RICHARDS.
MEANS APPLICABLE FOR USE IN MILLING SCREW THREADS.
APPLICATION FILED AUG. 14, 1918.

1,304,906.

Patented May 27, 1919.
2 SHEETS—SHEET 1.

INVENTOR

Geo. Richards

G. RICHARDS.
MEANS APPLICABLE FOR USE IN MILLING SCREW THREADS.
APPLICATION FILED AUG. 14, 1918.

1,304,906.

Patented May 27, 1919.
2 SHEETS—SHEET 2.

INVENTOR.
Geo. Richards

UNITED STATES PATENT OFFICE.

GEORGE RICHARDS, OF WESTMINSTER, LONDON, ENGLAND.

MEANS APPLICABLE FOR USE IN MILLING SCREW-THREADS.

1,304,906.  Specification of Letters Patent.  Patented May 27, 1919.

Application filed August 14, 1918. Serial No. 249,892.

*To all whom it may concern:*

Be it known that I, GEORGE RICHARDS, a citizen of the United States, residing at The Outer Temple, 222 Strand, in the city of Westminster, London, England, have invented new and useful Improved Means Applicable for Use in Milling Screw-Threads, of which the following is a specification.

This invention relates to an improved method of and apparatus for milling screw-threads in the surfaces of cylindrical or conical bodies which, owing to their size or shape, cannot conveniently be rotated.

The formation of screw-threads by means of rotary cutters is effected by two different methods. According to one method the cutting tool is fed gradually to the required depth of thread to be cut while the work and the cutter revolve at uniform rotative speeds, neither body partaking of axial motion. The cutting teeth are spiral, either right or left hand, with a pitch equal to that of the thread to be formed, and the cutter is termed a "hob." This method of forming threads on a stationary piece of work, and wherein the hob has no movement in an axial direction in relation to the work, is described in the specification to British Letters Patent granted to me and Henri Despaigne and dated 25th November 1915, No. 16680.

According to the other method of forming screw-threads by means of rotary cutters, the cutting teeth, instead of being spiral, are arranged in annular rings spaced at distances apart equal to the pitch of the thread to be formed. In this case, before the work commences its rotative movement, the cutter is fed into its surface to the full depth of the thread to be formed. A slow rotative movement is then imparted to the work, and the thread is completely formed during one revolution thereof; the cutter advancing during this period a distance in an axial direction equal to the pitch of the thread to be formed. Such a rotary cutter is termed a "milling cutter," as distinguished from a "hob."

In milling threads on large pipes and other bodies which are not quite truly cylindrical, the operation of cutting a thread to its full depth by means of a hob is not sufficiently rapid to be satisfactory; inasmuch as the hob may, during many revolutions about the work, only operate on the work at one point or part thereof.

According to my improved method of milling screw-threads in the surface of a piece of work which is not rotated, I employ a rotary cutter of the milling cutter type; the grooves between the annular rings of cutting teeth being of a size and contour corresponding with those of the screw-thread to be produced. The milling-cutter, while rotating on its own axis, makes but one circular or planetary movement about the axis of the work; during which operation, the screw-thread is cut to its full depth. During the same period, the work is caused to advance in an axial direction a distance equal to the pitch of the thread cut.

It has been proposed to construct screw-thread milling machines for cutting threads on a piece of stationary work and wherein the milling cutter is caused to partake of a planetary movement about the said work the cutter advancing, during the operation, axially a distance equal to one thread; but according to my improved method of working, the work is caused to advance one thread, the cutter partaking of no axial motion. By means of this modification I am enabled, with a given length of cutter, to cut a thread two or more times the length of the cutter without rendering the latter unduly overhung, as would be the case were the work to remain stationary and the cutter spindle to be protruded a distance sufficient to reach the unthreaded surface of the work beyond that already cut.

Figure 4:
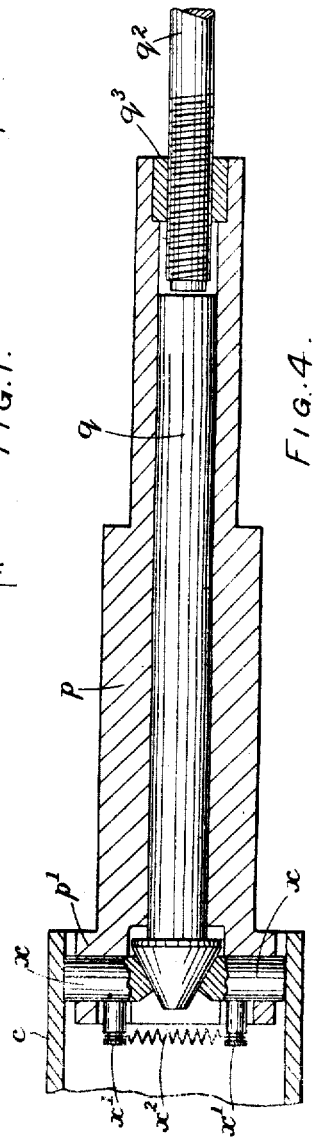
Figure 2:
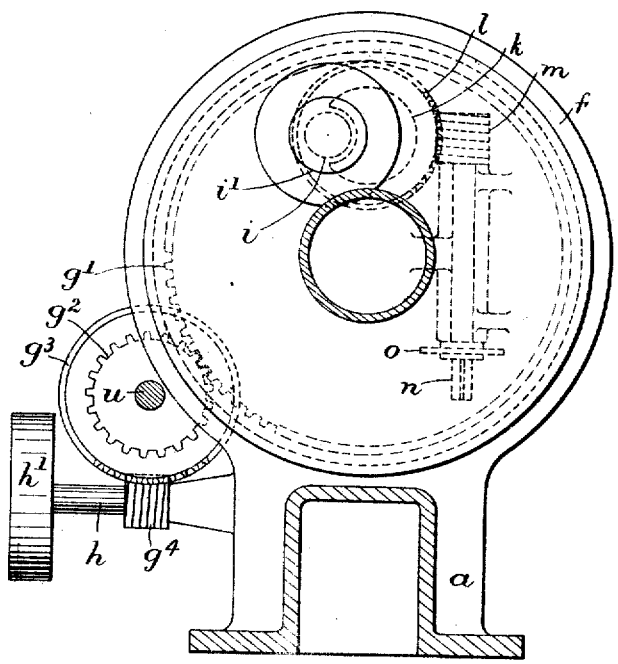
Figure 3:
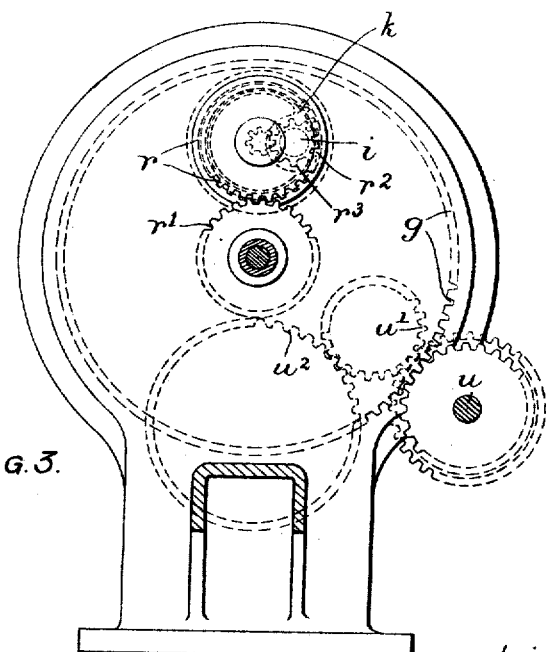

A machine designed to operate on a piece of work which does not rotate but partakes of an axial motion of the character above described is illustrated in the accompanying drawings, whereof Figure 1 is a side elevation, partly in section, Fig. 2 a transverse vertical section on the line X—X in Fig. 1, Fig. 3 a transverse vertical section on the line Y—Y in Fig. 1 and Fig. 4 a longitudinal section, on an enlarged scale, of an internal chuck for engaging with and steadying the extremity of the work under operation.

The machine comprises a bed plate, $a$ on which is arranged a carriage $b$ adapted to slide longitudinally and to hold the work $c$ in clamping jaws $d$. For moving the work manually and adjusting it to its required position, the carriage $b$ is provided with a rack and pinion $e$ $e'$. Mounted in bearings $ff$ formed in the frame is a drum or cylindrical shell $g$ provided with a circular toothed rack $g'$ to which a slow rotative motion is imparted by means of the toothed wheel $g^2$, worm-wheel $g^3$ and worm $g^4$, upon the transverse shaft $h$. The spindle $i$ which carries the thread-milling cutter $i'$ is eccentrically mounted in bearings $j$ formed in a trunnion-like body $k$; and the periphery of the latter is provided with worm-teeth $l$ which gear with a worm $m$ carried by a spindle $n$, preferably furnished with an index-wheel $o$ for showing the extent to which the milling-cutter is caused to approach, or to recede from, the axis of the piece of work under treatment.

The milling-cutter-spindle $i$ is driven, in any position which the trunnion-like body $k$ (in which it is mounted) may assume, by means of a toothed wheel $r$ which meshes with a toothed wheel $r'$ mounted on a sleeve; the latter passing through the bearing $s$ and having secured to it a pulley $t$. Connected with the toothed wheel $r$ is an internally toothed wheel $r^2$ which meshes with a pinion $r^3$ fast upon the cutter spindle $i$.

The piece of work to be operated on is held in clamping jaws $d$ which may be actuated by means of a right and left hand tightening screw, or by means of independent screws; the said clamping jaws being mounted in V-grooves to slide transversely upon the carriage $b$, thereby rendering the position of the work, in relation to the milling mechanism, capable of adjustment both longitudinally and transversely.

The back-shaft $u$ is operated, as already stated, from the transverse shaft $h$ by means of the worm-gear $g^3$ $g^4$. The opposite extremity of the back-shaft is provided with a gear-train $u$ $u'$ $u^2$ which imparts a slow rotative motion to the screw $v$; the latter working through a bi-part nut $v^1$ mounted in the longitudinal slide $b$ and capable of being released, in any usual manner, from engagement with the screw $v$. The said nut is cut with a thread corresponding with that to be cut in the work; and the said gear-train is so proportionate, in relation to the toothed gear which operates the drum $g$ carrying the trunnion-mounted cutter-spindle $i$, that the slide $b$ carrying the work advances one thread while the cutter $i'$ makes one complete planetary movement about the work $c$.

It will be observed that the only function of the pulley $t$ is to rotate the cutter-spindle while the pulley $h'$ on the transverse shaft $h$ effects both the planetary movement of the cutter about the work under operation and the longitudinal movement of the work. Under these circumstances, the two latter movements remain in constant correlation with one another after the work has been manually adjusted to its required position. This enables a further length of the work, corresponding with the width of the cutter, to be threaded, at the same time insuring a correct continuation of the threading as between the first portion and the additional portion, or each additional portion, of the threading.

For enabling the slide $b$ and work $c$ to be moved by hand, the back-shaft $u$ is provided with a clutch $w$, whereof one member is formed upon or attached to the worm-wheel $g^3$, while the other member slides upon a feather upon the shaft $u$; the worm-wheel $g^3$ being free upon the said shaft. Thus, when the clutch is out of gear, the screw $v$, the gear-train whereby it is operated, the back-shaft $u$, together with the drum $g$ carrying the eccentrically mounted cutter-spindle, can be rotated by hand for the purpose of expeditiously shifting the work to its new position, but without in any way disturbing the correlation of the respective mechanisms referred to. During this operation, the cutter, is by means of the spindle $n$ and worm-gear $l$ $m$, moved out of contact with the work; but, with the aid of the index-wheel $o$, may be subsequently restored to its original position, thereby insuring a continuation of the thread with the same depth of cut.

When externally threading hollow work, particularly where the metal is comparatively thin in substance, as in the case of a wrought iron pipe, I introduce into the open end of the work and in the plane of the cutter, an internal chuck, whereby the work is afforded solid support and resistance against deformation while under treatment. Such a chuck illustrated on an enlarged scale in Fig. 4, is of a laterally expanding character, and consists in a tubular carrier $p$ in which is mounted a spindle $q$ formed with a conical head $q'$. Mounted in the head $p'$ of the carrier $p$ are four or other number of radially arranged plungers $x$ whereof the inner ends bear against the conical head $q'$, while their outer extremities protrude beyond the head $p'$ of the carrier and engage with the inner surface of the work $c$. The plungers $x$ are respectively provided with studs $x'$ coupled together by means of tension springs $x^2$ for the purpose of retracting the plungers when the conical head $q'$ is withdrawn. Abutting against the opposite end of the spindle $q$ is arranged a thrust-rod $q^2$ having a threaded portion which works through a nut $q^3$ fixed in the extremity of the carrier $p$. The thrust-rod $q^2$ is continued and is free to move longitudinally through the toothed wheel $r'$, bearing $s$ and pulley $t$ (see Fig. 1), and may be rotated by means of a winch-handle or hand-wheel applied at its projecting extremity $q^4$ thereby tightening or releasing the chuck within the work $c$.

It will be apparent that the thread-milling apparatus described is applicable for milling internal as well as external threads, it being only necessary to reverse the direction of rotation of the milling cutter, or the direction in which it revolves within or about the piece of work under operation.

I claim:—

1. In screw-threading, with the aid of a milling cutter, a piece of work held against rotation, the herein described mode of operation according to which the work gradually advances in a longitudinal direction a distance equal to the pitch of the thread to be cut, while the milling cutter, rotating on its own axis, makes one complete circular movement about the axis of the work.

2. In a machine for screw-threading, with the aid of a milling cutter, a piece of work held against rotation, the combination, with means for holding the work against rotation and advancing it longitudinally a distance equal to the pitch of the thread to be cut, of means for simultaneously causing the cutter to make a complete circular movement about the axis of the work.

3. In a machine for screw-threading, with the aid of a milling-cutter, a piece of work held against rotation, the combination, of means for holding the work against rotation, means for rotating the cutter, means for causing the latter to make a circular movement about the axis of the work and means for simultaneously advancing the work longitudinally a distance equal to the pitch of the thread to be cut.

4. In a machine for screw-threading, with the aid of a milling cutter, a piece of work held against rotation, the herein described means for gradually advancing the work in a longitudinal direction a distance equal to the pitch of the thread to be cut while the said cutter makes one complete circular movement about the axis of the work; such means consisting in a master-screw, arranged to work through a fixed and screw-threaded bearing attached to the carrier in which the work is mounted, and rotated in correlation with the mechanism for imparting to the milling cutter a circular movement about the axis of the work; the whole operating in conjunction with a carrier adapted to hold the work against rotation.

5. For use in screw-threading hollow work, such as a pipe, held against rotation, the combination, with a rotary thread-milling cutter and means for causing same to make a circular movement about the axis of the work-piece, of a laterally expanding chuck, located substantially in the plane of the cutter's orbit and adapted to afford the work-piece internal support.

GEORGE RICHARDS.